United States Patent
Jäger et al.

(10) Patent No.: US 12,454,083 B2
(45) Date of Patent: Oct. 28, 2025

(54) DEVICE FOR FORMING OR MOLDING PLASTIC ELEMENTS ON SURFACES OF A SEMI-FINISHED PRODUCT

(71) Applicant: Anybrid GmbH, Dresden (DE)

(72) Inventors: Hubert Jäger, Dresden (DE); Michael Krahl, Dresden (DE); Tony Weber, Dresden (DE); Jan Luft, Dresden (DE)

(73) Assignee: Anybrid GmbH, Dresden (DE)

( * ) Notice: Subject to any disclaimer, the term of this patent is extended or adjusted under 35 U.S.C. 154(b) by 582 days.

(21) Appl. No.: 17/433,230

(22) PCT Filed: Feb. 20, 2020

(86) PCT No.: PCT/EP2020/054483
§ 371 (c)(1),
(2) Date: Aug. 23, 2021

(87) PCT Pub. No.: WO2020/173803
PCT Pub. Date: Sep. 3, 2020

(65) Prior Publication Data
US 2022/0134615 A1    May 5, 2022

(30) Foreign Application Priority Data
Feb. 25, 2019    (DE) ..................... 10 2019 202 513.7

(51) Int. Cl.
*B29C 45/14*    (2006.01)
*B29C 45/17*    (2006.01)

(52) U.S. Cl.
CPC .... *B29C 45/14065* (2013.01); *B29C 45/1761* (2013.01); *B29C 2045/14139* (2013.01); *B29C 2045/1768* (2013.01)

(58) Field of Classification Search
CPC ............................................. B29C 2045/1768
See application file for complete search history.

(56) References Cited

U.S. PATENT DOCUMENTS

| | | |
|---|---|---|
| 5,249,951 A | 10/1993 | Leonhartsberger et al. |
| 2004/0018269 A1 | 1/2004 | Carlson et al. |
| 2013/0249144 A1* | 9/2013 | Carlson ................. B29C 45/045 |
| | | 264/328.8 |

FOREIGN PATENT DOCUMENTS

| | | | |
|---|---|---|---|
| DE | 19950534 | * | 4/2000 |
| DE | 102006041415 | * | 4/2007 |

(Continued)

*Primary Examiner* — Edmund H Lee
(74) *Attorney, Agent, or Firm* — Blank Rome LLP

(57) ABSTRACT

A device for forming or molding elements on surfaces of a semi-finished product includes a C-shaped bracket element for displacing using a manipulator to a defined position with respect to a semi-finished product. An arrangement implemented for injection molding is disposed on a first leg and a backing holder is disposed on the second leg of the C-shaped bracket element. A semi-finished product can be disposed between the backing holder and the arrangement. A first molding tool is disposed in the direction toward a surface of the semi-finished product. The arrangement and/or the backing holder is/are displaceable against the corresponding surface of the semi-finished product, such that the open side of the first molding tool applies pressure to the corresponding surface of the semi-finished product and the backing holder contacts and applies pressure to the opposite surface of the semi-finished product.

19 Claims, 3 Drawing Sheets

(56) References Cited

FOREIGN PATENT DOCUMENTS

| | | | |
|---|---|---|---|
| DE | 10 2009 025 459 A1 | | 1/2010 |
| DE | 102013000388 | * | 7/2014 |
| JP | 5-208433 A | | 8/1993 |
| JP | H07115396 | * | 12/1995 |
| WO | WO9727972 | * | 8/1997 |
| WO | 2013/040510 A1 | | 3/2013 |
| WO | 2015/172829 A1 | | 11/2015 |

* cited by examiner

DEVICE FOR FORMING OR MOLDING PLASTIC ELEMENTS ON SURFACES OF A SEMI-FINISHED PRODUCT

CROSS-REFERENCE TO RELATED APPLICATIONS

This application is a National Stage of International patent application PCT/EP2020/054483, filed on Feb. 20, 2020, which claims priority to foreign German patent application No. DE 10 2019 202 513.7, filed on Feb. 25, 2019, the disclosures of which are incorporated by reference in their entirety.

FIELD OF THE INVENTION

The invention relates to a device for forming or molding elements, particularly plastic elements, on surfaces of a semi-finished product. Said device can be used particularly advantageously for large-scale semi-finished products, such as large sheet metal components, profiles, or body components in order to form plastic elements having the desired geometry and dimensions directly at a desired position. For example, plastic bushings can be produced directly in holes in a semi-finished product. But elements can also be molded onto the component. It is thereby advantageous when contour elements are present on surfaces of a semi-finished product into which element material is injected in an injection molding procedure, or when contour elements protruding above the surface of a semi-finished product can be encapsulated.

BACKGROUND

Particularly for large-format components to which elements are to be added, the effort for producing and for operating injection molding systems or tools suitable for the same is substantial, because a semi-finished product must fit at least to a large extent into a corresponding molding tool. The tooling costs thereby play a particularly large role for smaller part quantities.

The costs for injection molding tools also increase if elements are to be formed on semi-finished products at a plurality of positions spaced apart from each other, as expensive hot-runner systems are typically required for such forming.

As a rule, injection molding systems for forming hybrid structures made of metal or composite materials are overdesigned.

It is further disadvantageous that large material losses must be accepted when starting up an injection molding machine and large-scale molding tools.

Injection molding methods can be used for processing various materials; in addition to plastics, such as silicones and foams, metal and ceramic composite materials can be processed when an appropriate plastic matrix comprising metal or ceramic particles able to perform a binding function is processed by injection molding. Composite materials can also potentially subsequently be thermally purged of organic components and then sintered.

Within the method described, additional elements (metal inserts, pins, electrical and electronic elements, etc.) can be encapsulated by forming and bonded to a semi-finished product.

It is thus significant that when injection molding plastic, sufficient sealing of a molding tool is achieved, so that plastic cannot escape and it can be ensured that an injected element can be molded at the desired position and in the specified shape in each case. High forces and pressures are typically necessary to this end.

For known solutions, the closing force is typically transmitted by means of a C-shaped frame open on one side. The size of a semi-finished product to be placed in a molding tool is thereby not limited by the injection molding device. It is disadvantageous, however, that large and therefore expensive systems for displacing and positioning the semi-finished products must be used for large semi-finished products.

SUMMARY OF THE INVENTION

The object of the invention is to disclose potential means for flexibly producing elements formed by injection molding on semi-finished products and by means of which the disadvantages of the prior art can be avoided.

The object is achieved according to the invention by a device comprising the features of claim 1. Advantageous embodiments and refinements of the invention can be implemented by means of features identified in subclaims.

For the device according to the invention for forming or molding elements, particularly plastic elements, on surfaces of a semi-finished product, a C-shaped bracket element is advantageously configured to be displaced and positioned in a locally defined manner by a manipulator along at least one axis relative to a semi-finished product.

An arrangement implemented for injection molding is disposed on a first leg of the two legs of C-shaped bracket element disposed opposite each other, and a backing holder is disposed on the second leg of the C-shaped bracket element opposite the arrangement implemented for injection molding.

Alternatively, the arrangement implemented for injection molding can also be disposed on a leg of a positioning bracket and a backing holder can thereby be disposed on an opposite leg of the positioning bracket, wherein the arrangement implemented for injection molding and the backing holder disposed opposite thereto can be positioned relative to a second molding tool by means of the positioning bracket. In this case, a C-shaped bracket element having a holding bracket and a positioning bracket is formed. The holding bracket disposed outside of or parallel to the positioning bracket should thereby be joined with a hinge to a manipulator or to the arrangement implemented for injection molding and joined with a hinge to the backing holder. The positioning bracket should thereby be rigidly connected to the backing holder and to the arrangement implemented for injection molding.

A linear guide can be advantageously implemented on at least one of the legs of the positioning bracket for positioning the molding tools relative to each other, or a molding tool relative to the position of the backing holder. Bending of the C-shaped bracket element can be compensated for by means of the linear guide, and without a linear guide would lead to positioning errors occurring at a plastic element formed on a semi-finished product.

The linear guide is intended for enabling displacing the corresponding leg on which the linear guide is disposed on the positioning bracket perpendicular to the longitudinal axis thereof.

The positioning and holding brackets are thereby not connected to each other, but rather form parallel load paths. The holding bracket can transfer the compressive forces necessary for injection molding, while the positioning bracket can compensate for forces arising from the dead weight of the device.

Any arrangement principally suited for forming or molding elements can, however, also be used for the device according to the invention, wherein injection molding is preferable, however.

The device is further implemented such that a semi-finished product can be disposed between the backing holder and the arrangement when an element is to be formed.

A molding tool open in the direction toward the corresponding surface of the semi-finished product and having a negative contour of the corresponding element is disposed in the direction toward a surface of the semi-finished product on which an element is to be formed.

The arrangement and/or the backing holder is/are displaceable against the corresponding surface of the semi-finished product, such that the open side of the first molding tool applies pressure to the corresponding surface of the semi-finished product and the backing holder contacts and applies pressure to the opposite surface of the semi-finished product when an element is produced by means of injection molding, wherein the molding tool and backing holder are then disposed opposite each other.

A second molding tool can also be present on the backing holder and open in the direction toward the surface of the semi-finished product. Said tool can be disposed there or may be part of the backing holder. A second molding tool can be used, particularly when elements are to be produced on or in penetrations (e.g., drilled holes) implemented in the semi-finished product.

Variously implemented first and/or second molding tools can advantageously be interchangeably attached to the arrangement or to the backing holder, so that variously geometrically designed and/or dimensioned elements can be produced.

The arrangement and/or the backing holder can be translationally displaced by means of a drive in the direction of the corresponding surface of the semi-finished product and in the direction opposite thereto. When the arrangement and/or the backing holder are displaced in the direction toward a surface of the semi-finished product, then the semi-finished product is clamped between the first molding tool and backing holder. At least the first molding tool thereby makes contact with the surface of the semi-finished product, so that the first molding tool makes tight contact for plasticized elementary materials, and one element can be produced by injection molding on said surface by means of the arrangement. If a second molding tool is present, then said tool is analogously also sealed off at the surface opposite the semi-finished product, so that there as well part of an element can be implemented when plasticized elementary material can enter the second molding tool via a penetration in the semi-finished product. The backing holder should preferably be translationally displaceable by means of a drive.

The drive for the translational motion can be an electric drive, optionally connected to a gearbox, for achieving the necessary compressive forces. However, hydraulic or pneumatic drives can also be used on the device.

The C-shaped bracket element, the holding bracket, and/or the positioning bracket should be made at least partially of fiberglass or carbon fiber-reinforced plastic in order to address the lightweight design aspect and nevertheless have sufficient strength. Said element can also be implemented as a hybrid structure in which metal elements can also be present for reinforcing, stabilizing, and/or increasing strength.

The arrangement can be implemented having a plasticization unit comprising a screw feeder rotatably supported in a plasticization cylinder and implemented for transporting plasticized material into the molding tool(s). A heater should be present on a plasticization unit and connected to an element material infeed. In addition to or instead of a screw feeder, a device for applying a compressive force to plasticized material can also be used.

The C-shaped bracket element can be displaced manually by a worker by means of a pulling device or handling linkage, or displaced by means of a linear drive in one or more axes of motion, or by means of an industrial robot as a manipulator. The type of motion using a corresponding manipulator can be selected based on the semi-finished product being processed. A simple linear drive is sufficient, for example, by means of which the device can be displaced, when elements are to be formed along an edge of a semi-finished product at least at approximately constant spacing from the edge along the edge.

Displacing the device is also possible when the device is suspended on a sufficiently strong cable and can be displaced by a worker. To this end, a tensile force at least partially compensating for the mass of the device can act on the corresponding cable, so that the worker need only apply a small force for displacing the device to the desired position. If the device is to be used for producing complex elements to be formed at a plurality of different positions of a semi-finished product or for different semi-finished products, then the use of a multi-axis robot could be advantageous.

The displaceable injection unit can also be used for forming elements on semi-finished products within a continuous production process. The device and manipulator are thereby displaced in the production direction at the specified production speed. Hybrid structures can thus be produced in a continuous process line without having to remove the components from said line.

The backing holder or the part of the backing holder or second molding tool of the backing holder for making contact with the surface of the semi-finished product can be rotatably supported about one or two axes aligned perpendicular to the direction of applied force of the arrangement. A balance can thereby be achieved when the surface of the semi-finished product facing the backing holder is uneven or an angled surface is present. The rotatability and optionally also tiltability of the backing holder or a part of the backing holder can ensure that contact with the corresponding surface of the semi-finished product can also be achieved for angled surfaces. The backing holder or a part of the backing holder can be joined with a hinge to the second leg or a leg of the positioning bracket for pivoting and potentially also for rotating. Damage to surfaces of the semi-finished product can thereby also be prevented, as can occur particularly when placing the backing holder or a part of the backing holder against the corresponding surface of the semi-finished product.

A rotatable backing holder or a rotatable part of a backing holder can also be used in conjunction with a second molding tool, when at least the second molding tool is implemented for producing a rotationally symmetrical part of an element.

Molding tools usable for a device according to the invention can also comprise a plurality of individual molds, including molds separated from each other, said molds in turn being filled with plasticized element material preferably separately via at least one channel each. The individual molds can have different geometric designs and/or dimensions, so that correspondingly different elements can be formed. Feeding in plasticized element material can be controlled so that only one or more particular molds of a molding tool are filled with plasticized element material and thereby particular elements are formed. To this end, for example, a controlled valve can be disposed in a channel via which the plasticized material is transported into a particular mold of a molding tool. Said molds are, of course, also open in the direction toward the corresponding surface of a semi-finished product.

A modular building-block system for many applications can be made available by means of the invention.

A uniform or standardized interface can be present for connecting different manipulators by means of which a desired motion for the locally defined positioning and/or aligning of the device with respect to a semi-finished product can be performed.

The device according to the invention can be integrated in existing process sequences in which a plurality of different process steps are performed.

Productivity can be increased and costs reduced.

Different materials known to be suitable for injection molding can also be used for producing elements. Resins can also be injected into recesses or penetrations.

Only the length of the two legs of the C-shaped bracket element has a particularly limiting effect on the application.

The invention is described below in greater detail using examples.

BRIEF DESCRIPTION OF THE DRAWINGS

Shown are.

DETAILED DESCRIPTION

Figure 1:
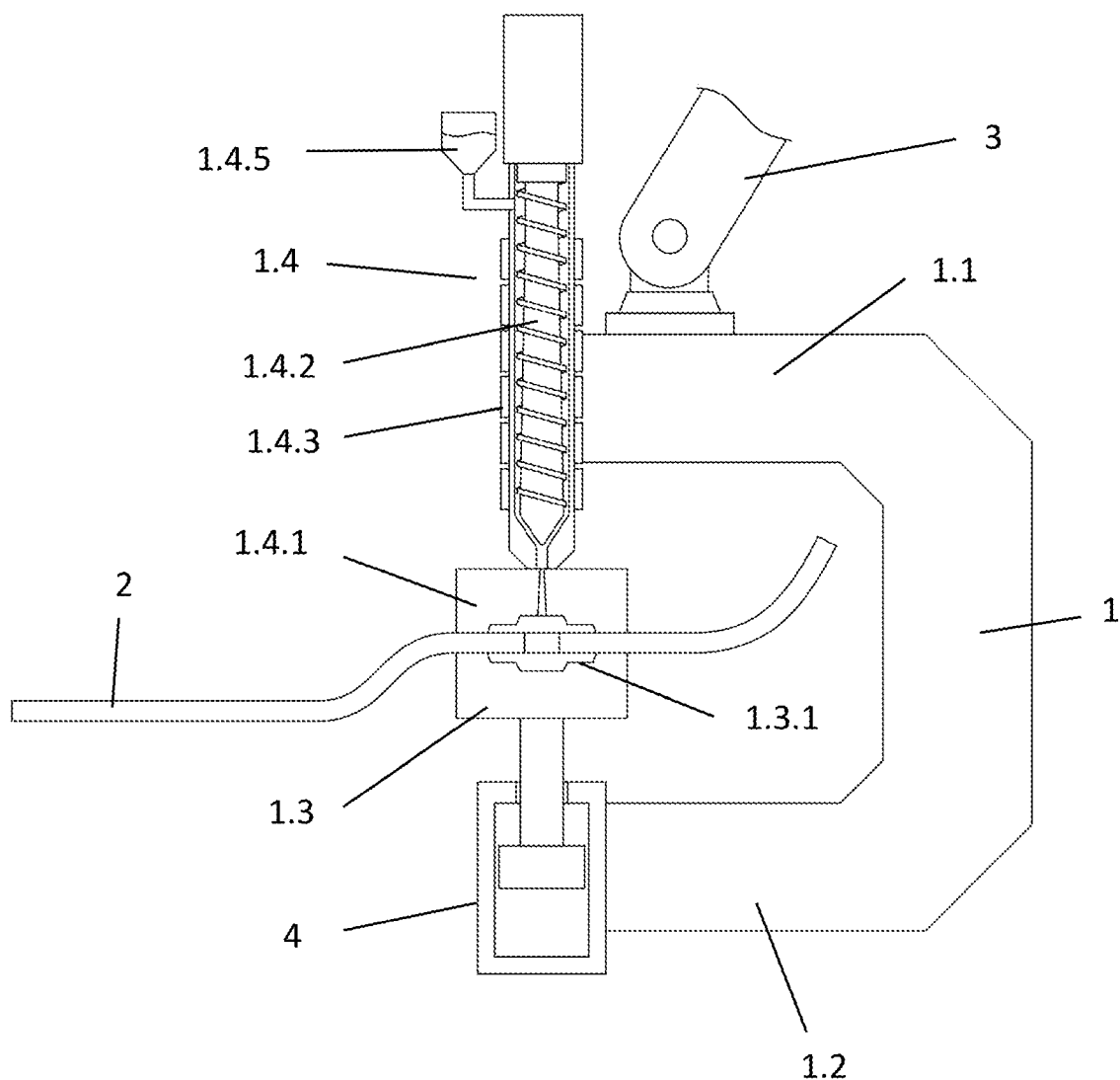
FIG. 1 a schematic section view of an example of a device according to the invention.

FIG. 1 shows an example of a device according to the invention, wherein a C-shaped bracket element 1 is made largely of a carbon fiber-reinforced plastic (CFRP), so that the entire intrinsic weight of the device is a maximum of 120 kg, but preferably less than 100 kg, and particularly preferably a maximum of 50 kg.

An arrangement 1.4 is attached to a first leg 1.1 of the C-U-shaped bracket element 1. The arrangement is formed by a plasticization cylinder 1.4.3 having a heater and in which a screw feeder 1.4.2 is rotatably supported. A feeder 1.4.5 for element material present in granulate form, potentially a pure plastic but also a filled plastic or a plastic, metal, or ceramic mixture, is connected to the arrangement 1.4. The plasticized element material fed to the first molding tool 1.4.1 and in the present example also to the second molding tool 1.3.1 can be metered by means of the number of revolutions of the screw feeder or the rotational speed thereof.

The device can be positioned on a semi-finished product 2 by means of an additional manipulator 3, as explained in the general part of the description, for forming an element on the semi-finished product 2.

FIG. 1 shows how the device is positioned in a locally defined manner on the semi-finished product 2. The backing holder 1.3 disposed on the second leg 1.2 of the C-shaped bracket element 1 has also been displaced against the bottom surface of the semi-finished product here by means of the hydraulic drive 4. The displacing has taken place such that the sealing surface of the second molding tool 1.3.1 contacts said surface of the semi-finished product 2 and thereby the sealing surface of the first molding tool 1.4.1 also contacts the opposite surface of the semi-finished product 2. Compressive forces thereby act there to ensure that no element material can escape from the two molding tools 1.3.1 and 1.4.1 when injection molding, until the element material has cooled off sufficiently that demolding can take place by displacing the backing holder 1.3 in the opposite direction.

To this end, the device has been positioned by means of the drive, not shown, so that the first and second molding tool 1.3.1 and 1.4.1 are positioned exactly so that an element can be produced, even inside a hole formed in the semi-finished good 2. Bushings, clips, or seal plugs can thus be produced as elements.

In the example shown here, the first and second molding tools 1.3.1 and 1.4.1 are each identical in design, but this is not absolutely necessary.

An embodiment of the device according to the invention according to FIG. 1, wherein an arrangement 1.4 and a hydraulic drive 4 are rigidly connected by means of a bracket element 1, has the disadvantage that spreading of the bracket element 1 occurs due to a force applied by the hydraulic drive 4, leading to undesired shifting of the molding tools 1.4.1 and 1.3.1 relative to each other. Said shifting can be reduced by means of a flexurally rigid yet massive embodiment of the bracket element 1.

Figure 2:
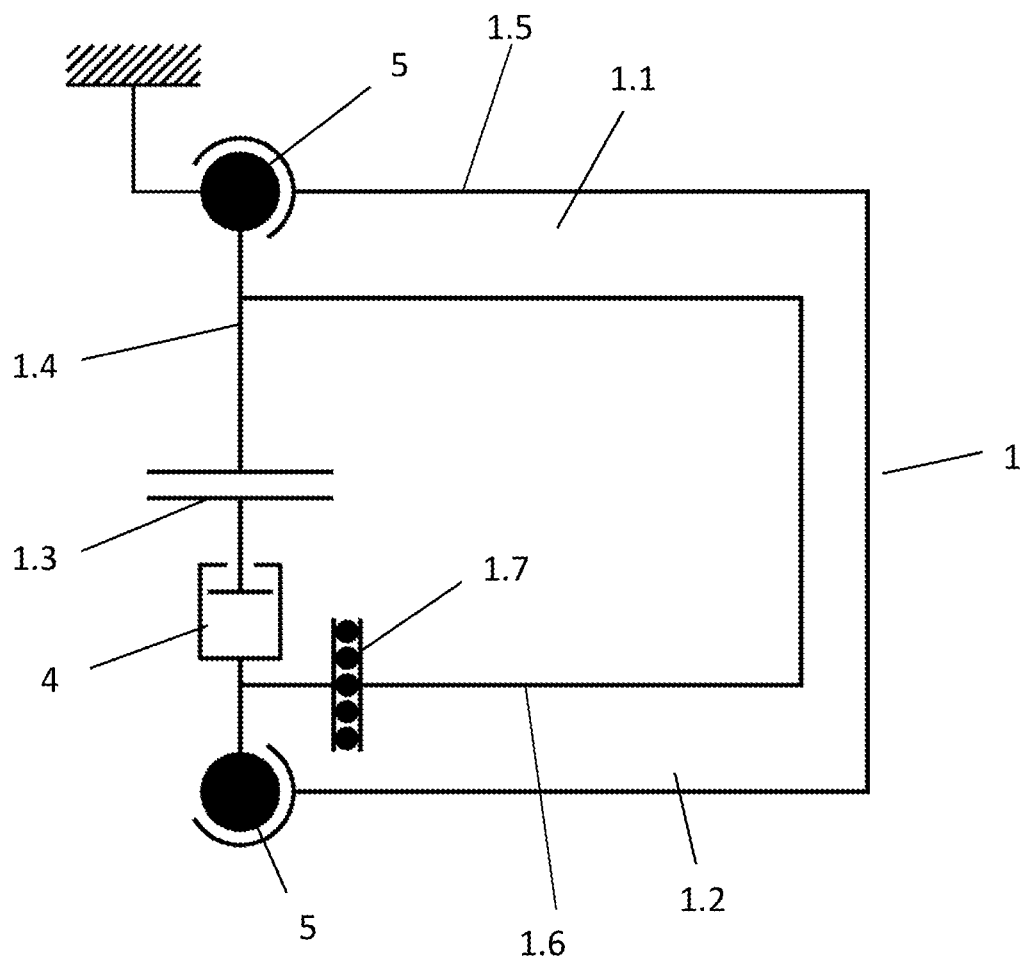
FIG. 2 a kinematic model of an advantageous embodiment of a device according to the invention.

The kinematic model shown in FIG. 2 alternatively presents an advantageous embodiment of a device according to the invention, wherein the substantial functions of the C-shaped bracket element 1—"transmitting force" and "positioning the molding tools"—are functionally separated. A molding tool 1.4.1 and the backing holder 1.3, or the two molding tools 1.4.1 and 1.3.1, are thereby guided toward each other by means of a leg of the positioning bracket 1.6, such that only one degree of freedom remains in the direction of force application line of the hydraulic drive 4 and is relieved by a linear guide 1.7. The compressive force is applied by means of a holding bracket 1.5 for pressing a molding tool 1.4.1 and the holding bracket 1.3 or two molding tools 1.4.1 and 1.3.1 against the corresponding surface of the semi-finished product 2 under pressure while the processing is being performed. The holding bracket 1.5 is rotatably connected by means of the hinge 5 to a manipulator (not shown) or to the arrangement 1.4 implemented for injection molding and the backing holder 1.3.

The bending open, as occurs in the mounting bracket 1.5 when the pressure forces act, can be compensated for by means of the linear guide 1.7 present on one leg of the positioning bracket 1.6, so that no bending load arises in the positioning bracket 1.6 due to the effects of the compression forces.

Figure 3:
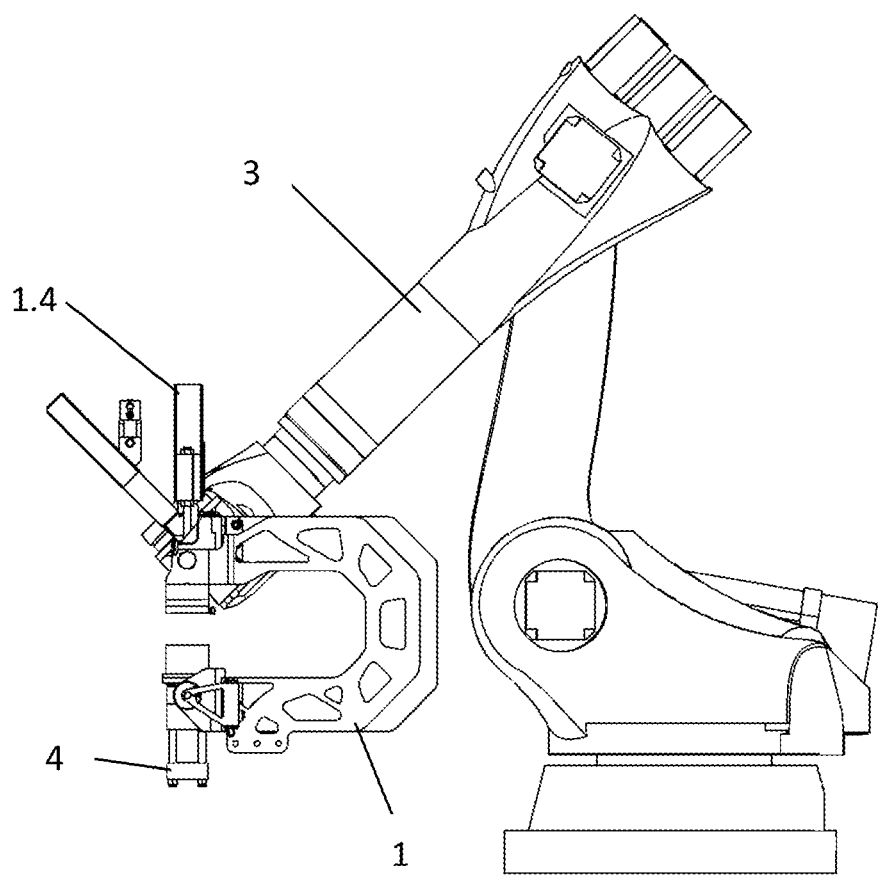
FIG. 3 an embodiment example of a device according to the invention having a multi-axis robot as a manipulator.

FIG. 3 shows an embodiment of the invention, wherein a C-shaped bracket element 1 is displaced by means of a manipulator 3 implemented as a multi-axis robot. The closing force is generated by a drive 4 implemented as a hydraulic cylinder. The forming of plastic elements on a semi-finished product 2 (not shown) is performed by an arrangement 1.4 implemented as an injection molding unit and mounted on the C-shaped bracket element 1.

The invention claimed is:

1. A device for forming or molding elements on one or more surfaces of a semi-finished product, the device comprising:
   a C-shaped bracket element configured to be positioned along at least one axis relative to the semi-finished product by a manipulator,
      wherein the C-shaped bracket element has a C-shaped holding bracket and a C-shaped positioning bracket, and
      wherein the C-shaped holding bracket is disposed outboard of or parallel to the C-shaped positioning bracket;
   an arrangement adapted for injection molding disposed on a first leg of the C-shaped holding bracket;
   a backing holder disposed on a second leg of the C-shaped holding bracket opposite the arrangement and adapted for injection molding,
      wherein the semi-finished product is disposed between the backing holder and the arrangement when an element is to be formed or molded on a surface of the semi-finished product; and
   a first molding tool disposed in a direction toward the surface of the semi-finished product on which the element is to be formed or molded, the first molding tool having an opening in a direction toward the surface of the semi-finished product and having a negative contour in the shape of the element,
      wherein the first molding tool and backing holder are disposed on opposite sides of the semi-finished product,
      wherein the arrangement and/or the backing holder is displaceable against the surface of the semi-finished product, such that the opening of the first molding tool applies pressure to the surface of the semi-finished product and the backing holder contacts and applies pressure to an opposite surface of the semi-finished product while the element is formed or molded,
      wherein the arrangement comprises a plasticization unit for metered feeding of plasticized material into the first molding tool, and a feeder for feeding element material in granulate form to the plasticization unit, and
      wherein the first molding tool defines at least one channel fluidly connecting the plasticization unit and the negative contour, the at least one channel configured to transport the plasticized material from the plasticization unit into the negative contour.

2. The device according to claim 1, further comprising a second molding tool disposed on the backing holder and open in the direction toward the surface of the semi-finished product.

3. The device according to claim 1, wherein differently formed molding tools are interchangeably attachable to the arrangement or to the backing holder.

4. The device according to claim 1, wherein the arrangement and/or the backing holder are configured to be translationally displaced by a driver in the direction of the surface of the semi-finished product and in the direction opposite of the surface of the semi-finished product.

5. The device according to claim 1, wherein the C-shaped holding bracket is connected to the manipulator via a hinge.

6. The device according to claim 1, further comprising a linear guide provided on at least one leg of the C-shaped positioning bracket for positioning a plurality of molding tools relative to each other, or for positioning the first molding tool relative to the backing holder.

7. The device according to claim 6, wherein the linear guide is configured to displace the at least one leg of the C-shaped positioning bracket perpendicular to a longitudinal axis of the C-shaped positioning bracket.

8. The device according to claim 1, wherein the C-shaped bracket element is formed at least partially of glass-or carbon fiber-reinforced plastic.

9. The device according to claim 1, wherein the arrangement and the backing holder are pivotally joined to the corresponding first and second legs or to the C-shaped holding bracket via hinges.

10. The device according to claim 1, wherein the C-shaped holding bracket is formed at least partially of glass-or carbon fiber-reinforced-plastic.

11. The device according to claim 1, further comprising an interface for connecting the device to the manipulator.

12. The device according to claim 1, wherein the C-shaped positioning bracket is formed at least partially of glass-or carbon fiber-reinforced-plastic.

13. The device of claim 1, wherein the plasticization unit comprises a heater.

14. The device of claim 13, wherein the plasticization unit further comprises a screw feeder rotatably supported in the heater.

15. The device of claim 1, wherein the element material is at least one of pure plastic, filled plastic, a plastic and metal mixture, or a plastic and ceramic mixture.

16. The device of claim 1, wherein the manipulator is a multi-axis robot.

17. The device of claim 4, wherein the driver is an electric drive, a hydraulic drive, or a pneumatic drive.

18. The device of claim 17, wherein the hydraulic drive is a hydraulic cylinder.

19. The device of claim 1, wherein the backing holder is rotatably connected to the second leg of the C-shaped holding bracket by means of a hinge, and wherein the backing holder is connected to one leg of the C-shaped positioning bracket by means of a linear guide.

* * * * *